Dec. 6, 1966 H. J. WHITEHOUSE 3,290,649

DELAY LINE SIGNAL DETECTOR

Filed Dec. 24, 1963 3 Sheets-Sheet 1

INVENTOR.
HARPER J. WHITEHOUSE
BY
V. C. Muller
ATTORNEY.

INVENTOR.
HARPER J. WHITEHOUSE
BY
V.C. Muller
ATTORNEY

Dec. 6, 1966 H. J. WHITEHOUSE 3,290,649

DELAY LINE SIGNAL DETECTOR

Filed Dec. 24, 1963 3 Sheets-Sheet 3

INVENTOR.
HARPER J. WHITEHOUSE
BY
V.C. Muller
ATTORNEY.

United States Patent Office 3,290,649
Patented Dec. 6, 1966

3,290,649
DELAY LINE SIGNAL DETECTOR

Harper J. Whitehouse, Hacienda Heights, Calif., assignor to the United States of America as represented by the Secretary of the Navy Filed Dec. 24, 1963, Ser. No. 333,241
8 Claims. (Cl. 340—146.2)

Figure 1:
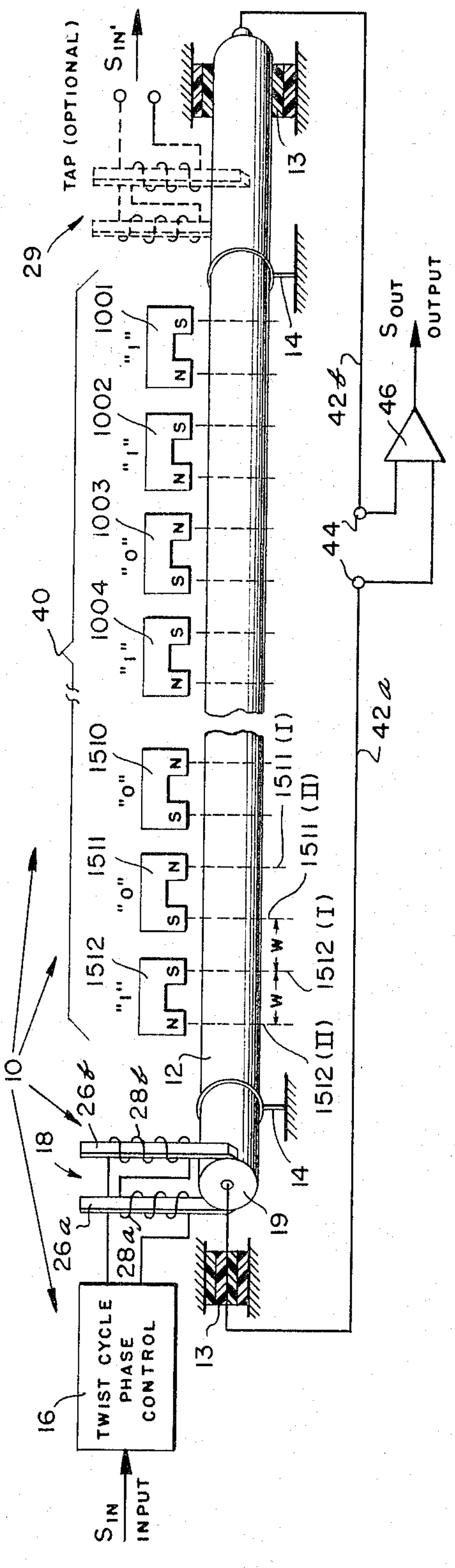

The invention described herein may be manufactured and used by or for the Government of the United States of America for governmental purposes without the payment of any royalties thereon or therefor.

This invention relates to methods and apparatus for searching for a predetermined finite sequence of digital characters in a continuous digital wave train, and has a particular utility in connection with digitally processed correlation detection systems. The present invention relates more particularly to improvements making it convenient to search for sequences which are in the order of 500 digital characters in length or longer and to search the wave train under its bit-by-bit progression along a signal channel, with the result that each interval of overlapping 500 bit intervals having their origin spaced apart by one bit may be searched. For example, the invention permits searching, at one instant of time for the presence of the digital sequence in a finite portion of the wave train 500 bits in length and starting at some particular moment in time, and one bit later searches a portion of the wave train containing one new bit interval and the last 499 bit intervals of the interval previously searched. Broader aspects of the invention further relate to a method and apparatus for comparing finite portions of a continuous wave with a predetermined finite reference wave shape under progression of the continuous wave along a signal channel, the latter comparison not being limited to discrete waveforms but including waveforms having continuous wave form, complex aperiodic waveforms and others.

Digitally processed correlation detection schemes are used in situations where very weak or noisy signals must be handled. The noise may in fact exceed the signal level by many times. The signal to be recognized originates in some signal source in the form of a pulse code representing a predetermined digital sequence of typically 500 characters or more. The greater the number of characters in the pulse code, the more effective is the correlation detection. At the place where the signal is utilized a receiver monitors a continuous input. Because of the stipulated condition that the noise exceeds the signal, this continuous input to the receiver would appear as noise to any signal envelope detection technique, whether the pulse code sequence was present or not. At the input of correlation detection systems the input is transformed into a digital pulse train, for example by sampling it at a sampling rate which satisfies certain requirements pursuant to mathematic theories of communication, and quantizing the sampled wave values as one or the other of two wave amplitude values. Presence of the pulse code in the continuous digital pulse train may then be determined by searching for the predetermined sequence by a process that is equivalent or closely approximates a statistical correlation computation. A correlation computation may be approximated by an operation in which a simultaneous comparison is made of each character of the portion of the wave train under examination with the corresponding character of the predetermined code sequence and must be followed by some sort of a summation of individual matches and mismatches represented by positive and negative unit values, respectively. Thus if a continuous input is to be searched the comparison technique must be fast enough to make comparison of the instantaneous condition of each character of a wave train and the summation at the rate of the bit-by-bit progression of the wave train along its channel. Accordingly, the important need in searching for a sequence in a wave train is that the rate at which individual examinations are performed be equal to the bit rate of the wave train. The prior art technique for searching a continuous input for a predetermined code sequence was to employ an electronic shift register having a number of memory cells equal to the number of characters of the sequence. Electronic logic decision circuitry consists of gating diodes and resistors are then connected to the individual memory elements of the register to gate only characters that correspond to the specific reference sequence. A multiplicity of other logic circuitry was required that perform simultaneous summation in response to the operation of the individual gates. The prior art technique also required a synchronous timing system which precisely advanced the digital characters through the register, and synchronously operates the gates. As the number of characters in code sequence goes up, the number of electronic components needed for such equipment increases, and system complexity and unreliability of individual components is almost prohibitive for sequences of 500 characters and more.

Prior attempts to overcome this difficulty have included use of a rotating magnetic drum to store the signal under scrutiny and a distributed magnetic head positioned above the moving drum, with the geometry and windings of the sections of the distributed head constructed and arranged to make a comparison with the desired reference sequence. A severe limitation in using such rotating drum technique is the well known difficulty of maintaining the required critical dynamic balance of drum for operation at high speeds commensurate with digital signal systems.

Also, the convenience of changing code sequence is particularly important with military equipment where there may be a need to use a variety of codes for security, or in order to use a selection of code sequences having special properties for extraction of information from echo ranging signals in sonar and radar. In the shift register type apparatus, very substantial additional complexity is needed to provide circuit adjustability for conveniently changing a code sequence. In rotating drum apparatus convenient adjustability is difficult.

Furthermore, prior to the present invention it was not considered possible to employ statistical signal processing techniques in the self-contained guidance control units within missiles and torpedoes, and other small equipment because of the bulkiness of either of the shift register or memory drum equipment.

Recognizing the foregoing problems and seeking their solution, the objectives of the present invention includes provision of:

(1) Highly simplified apparatus for detecting presence of a finite sequence of digital characters in a continuous signal at a sufficiently high speed to examine each sequence of all possible overlapping sequences under bit-by-bit progression of the digital characters through a signal channel.

(2) Apparatus in accordance with the previous objective in which the sequence of characters searched for may be conveniently changed either manually or electrically.

(3) Apparatus in accordance with the first mentioned objective which is sufficiently compact for use in smaller ordnance devices such as rocket delivered torpedoes.

(4) Apparatus in accordance with the first mentioned objective which is constructed with material and assembly costs representing a very small fraction of the corresponding costs with conventional digital circuitry.

(5) A method and apparatus for making a continuous comparison of a continuously varying input signal with a reference representing a finite wave, and which is useful in connection with a variety of wave forms, including those having continuous wave values, discrete values or complex aperiodic time functions.

Figure 5:
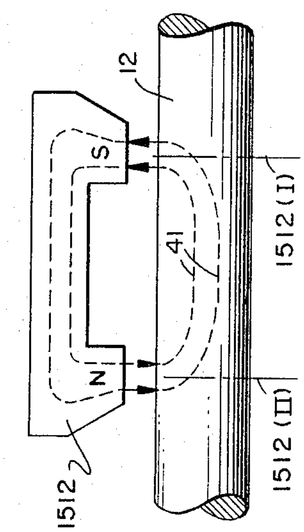
Figure 9:
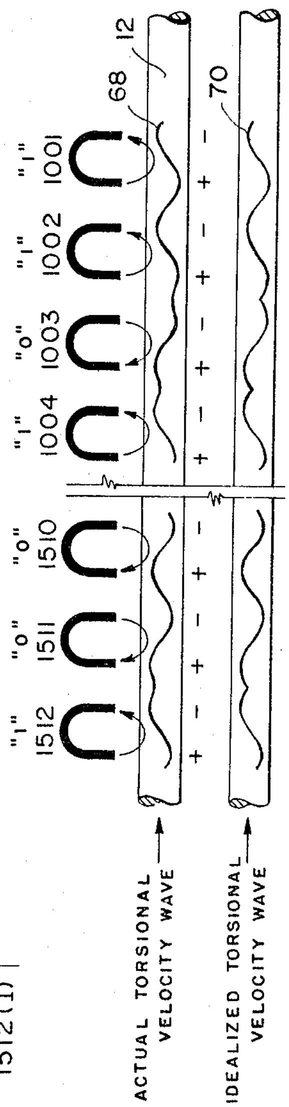
Figure 2:
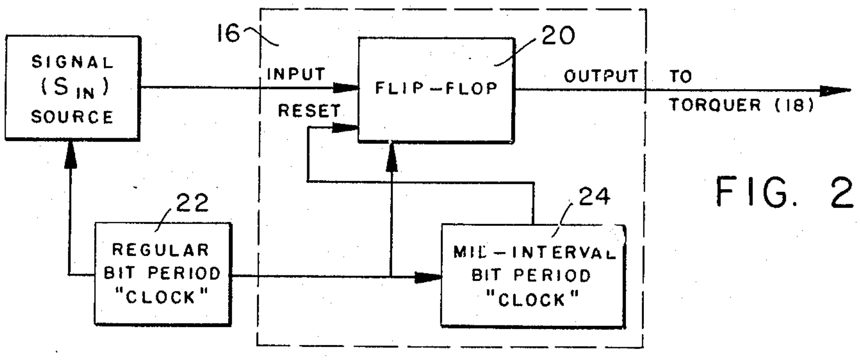
Figure 3:
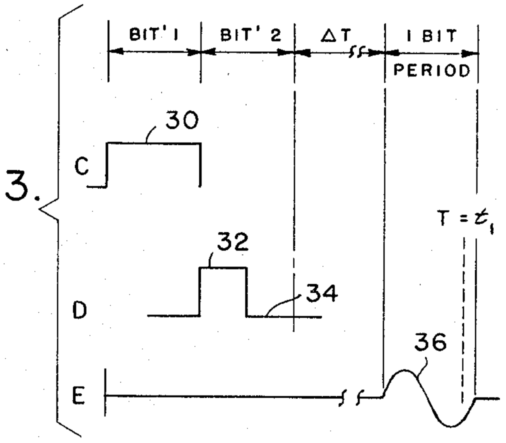
Figure 8:
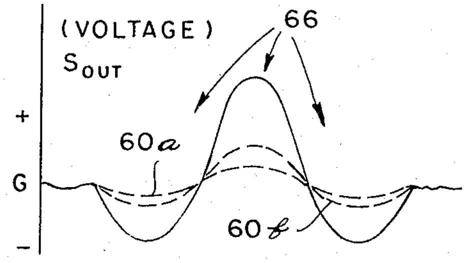
Figure 4:
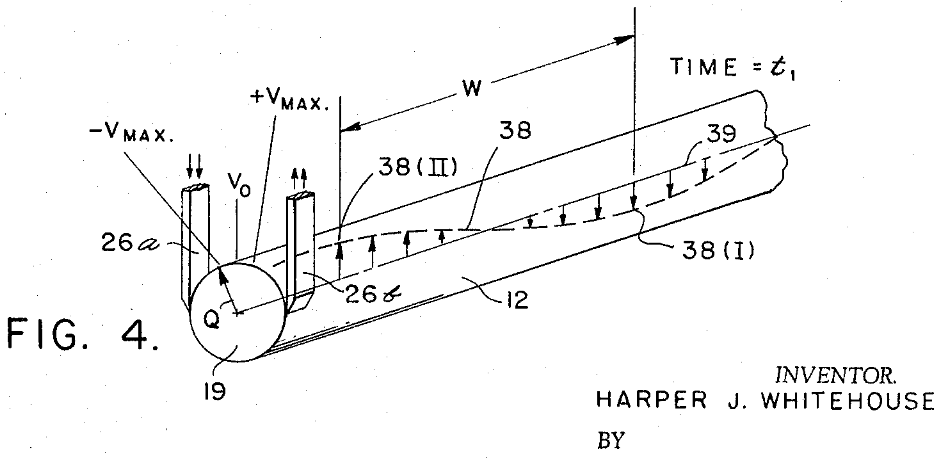
Figures 6A, 6B, 6C:
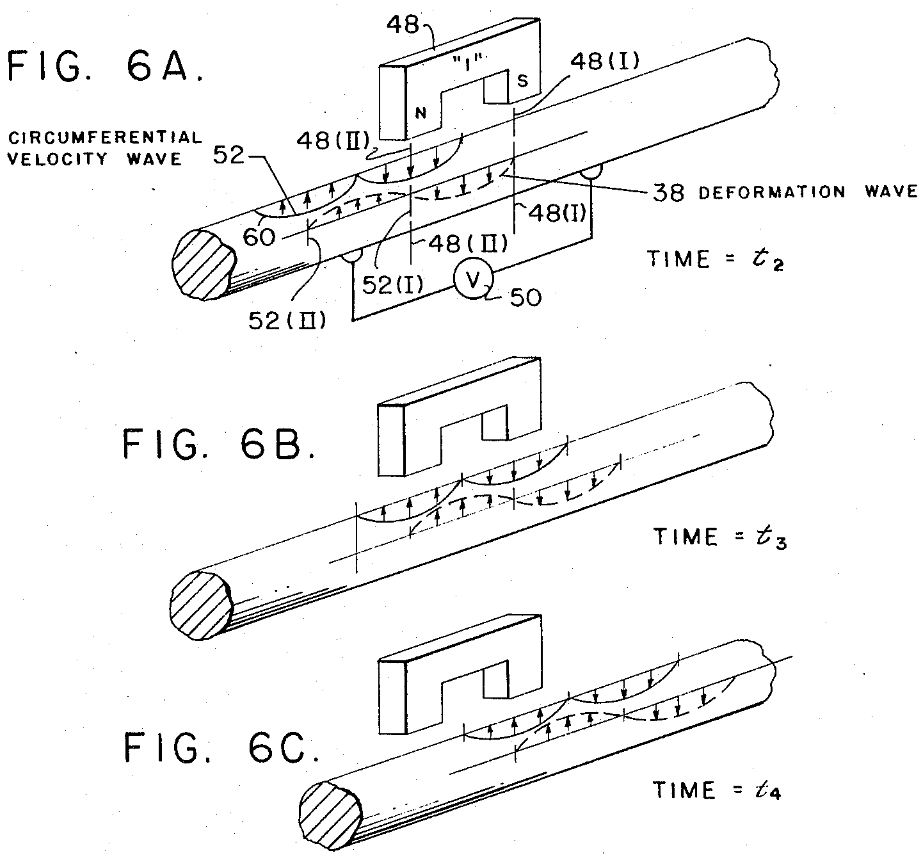
Figure 7:
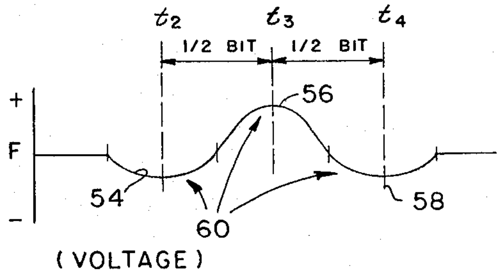

Other objects and many of the attendant advantages of this invention will be readily appreciated as the same becomes better understood by reference to the following detailed description when considered in connection with the accompanying drawings wherein:

FIG. 1 is a schematic of a correlation detector, embodying the present invention, FIG. 2 is a block diagram of a detail of FIG. 1, FIG. 3 is a waveform timing chart illustrating mode of operation of the structure illustrated in FIG. 2, FIG. 4 diagrammatically (in highly exaggerated scale) illustrates the launching of a deformation wave along a wire, FIG. 5 is a detail of FIG. 1, FIG. 6A, 6B and 6C diagrammatically depict sequential conditions of a deformation wave traversing a magnet, FIG. 7 is a waveform associated with FIG. 6, FIG. 8 is a waveform of the output of the device of FIG. 1, and FIG. 9 diagrammatically represents an instantaneous condition occurring during detection of the presence of a code group.

Referring now to the drawing, and in particular to FIG. 1, a code group detector 10, detects the presence of a predetermined digital sequence of regular intervaled two-level binary signal characters in a continuous input signal wave $S_{in}$. For purposes of illustration it will be assumed that the code group to be detected consist of a sequence of five hundred and twelve sequentially ordered binary characters consisting of a predetermined series of "0" and "1" characters. A high amplitude state during a bit interval represents the binary "1" character, and a low amplitude state represents the binary "0" character. For purposes of simplicity only the first four and last three of the bit characters of the code group need be considered, and these are assumed to consist of the following series of binary digits.

| | | | |
|---|---|---|---|
| $BIT_1$ ------------- | "1" | $BIT_{510}$ ------------ | "0" |
| $BIT_2$ ------------- | "1" | $BIT_{511}$ ------------ | "0" |
| $BIT_3$ ------------- | "0" | $BIT_{512}$ ------------ | "1" |
| $BIT_4$ ------------- | "1" | | |

Code group detector 10 comprises a conventional delay line device for propagating a torsional deformation wave composed of a span of wire 12 which is non-rigidly supported by suitable supports 14, shown schematically, and damping means 13 to prevent wave reflections. The damping means 13 adjacent the left and (as shown in the drawing) of line 12 is connected about electric lead 42a, rather than to the wire itself, in order to avoid interference with a transducer. It is to be understood that the damping means 13 are made of a resilient material, such as thin layers of foam rubber, to provide an energy absorptive coupling, and are not rigid clamp-like supports. Wire 12 is made of a material such as the nickel alloy known commercially as Ni-Span C which is conductive, permeable, magnetostrictive, and will transmit acoustic shear waves. The combination of being permeable and magnetostrictive provides the largest concentration of flux, and the highest coupling between an acoustic wave and propagating material, respectively. The desirability of these characteristics will become apparent as the specification proceeds. Nn-Span C wire is of the so called isoelastic or Invar type, which provides desired stability of operation over a range of temperature changes, as the result of intrinsic temperature compensation balance between its velocity of propagation characteristics and its thermal expansion characteristics. Forming the input of the delay line device is a twist cycle phase control circuit 16, and a magnetostrictive ribbon-type torquer 18 coupled to wave launching end 19 of a delay line wire 12. As shown in FIG. 2, driver and phase control circuit 16 may in a simple form consist of a flip-flop 20, which is set to the state of input signal $S_{in}$ for the previous bit period at the beginning of a regular bit interval in accordance with the regular timer or "clock" 22, and is then reset to its other state by a mid-interval bit period "clock" 24 which provides a clock signal half-way between the start and termination of a regular bit interval. Circuits, such as circuit 16 are conventional in the art of digital signals and are sometimes referred to as a "manchester encoder." Torquer 18, FIG. 1, comprises a pair of magnestostrictive ribbons 26a, 26b. A pair of driver coils, 28a, 28b are wound about ribbons 26a, 26b, respectively, and in mutually opposite directions, and are connected in series circuit and across the output of phase control 16. The other co-adjacent ends of ribbons 26 are conveniently damped (not shown) and a harmonic distortion inhibiting magnetic bias is applied to the ribbons (not shown). If desired another magnetostrictive ribbon device 29, shown in phantom, may be mounted to wire 12 near its other end, where it would serve to convert a traveling wave back into an electrical signal $S_{in}'$, in instances in which non-destructive processing of the signal is desired.

The operation of circuit 16 and torquer 18 may be best understood by first considering a single cycle of their operation, for which reference is made to FIGS. 2, 3 and 4. At a bit time $BIT_1'$ the input voltage to flip-flop 20, waveform C, FIG. 3 is in its high amplitude state pulse condition representing a binary "1" character. This sets flip-flop 20 to provide a high-state half-bit signal 32, waveform D, at the start of $BIT_2'$. In the middle of $BIT_2'$ flip-flop 20 is reset to a low-state half-bit signal 34 by the mid-interval bit period clock 24. The abrupt voltage rise at the start of half-bit signal 32, and the abrupt voltage drop at the start of half bit signal 34 produces a sequence of current changes (not shown in any of the waveforms) in driver coils 28a, 28b in opposite senses of current changes. The first of the sequential current changes produces a magnetostrictive contraction impulse in ribbon 26a and an elongation impulse in ribbon 26b, which in turn applies a clockwise force couple to the end of wire 12. In similar manner the second sequential current change produces a counter-clockwise force couple. In response, end 19 of the wire is twisted thorugh a generally sinusoidal torsional twist cycle 36, graph E, FIG. 3. As best shown in FIG. 4, cycle 36 comprises the twisting of a reference radius arrow Q, from its neutral or untorsioned angular position $V_0$, to a peak clockwise angular position $+V_{max}$, and thence in the reversed or counterclockwise direction to a peak counterclockwise angular position $-V_{max}$, and thence back to the relaxed position $V_0$. The period of twist cycle 36 is equal to the signal bit period at the input to flip-flop 20 and lags termination of the second half-bit signal 34 by a time $\Delta T$ representing the time for the magnetostrictive forces to propagate through ribbons 26a and 26b. Twisting end 19 of the wire through cycle 36 in turn launches a single torsional deformation traveling wave cycle, represented by dashed line 38, FIG. 4 (and associated small arrows indicating the direction of deformation from longitudinal reference line 39). The wire in FIG. 4 is illustrated in its instantaneous position of traveling wave movement, Time=$t_1$, corresponding to the amount when twist cycle 36, graph E, FIG. 3, is in its 315° phase position. Traveling wave cycle 38 has a pair of peaks of opposite displacement, designated displacement peak 38(I) and 38(II), in order of sequence of travel along the delay line. These displacement peaks are separated by a distance W, equal to the distance traveled by wave 38 during an interval equal to one-half of the signal bit period at the input to flip-flop 20, determined by the propagation characteristics of wire 12. In a similar manner it can be shown that for a traveling wave corresponding to a "0" input to flip-flop 20, sequential peaks 38(I) and 38(II) would be counterclockwise and clockwise, respectively. Stated in other terms, if signal bit 30 were a low state signal, twist cycle 36 would be initiated at a 180°, or reverse phase condition. In summary, a torsional traveling wave cycle is launched in response to each bit signal applied to the input of driver and twist cycle phase control 16, and the order of clockwise and counterclockwise deformation of the wave is selectively sequenced in accordance with the state of the signal bit input to circuit 16. Thus, circuit 16 and torquer 18 serve to produce a deformation cycle having selectively sequenced bidirectional characteristics. Any suitable binary signal translater or encoder that produces a pair of selectively sequenced bidirectional impulses in driver coils 28*a*, 28*b*, which would launch such a deformation cycle may be substituted in place of circuit 16.

Referring again to FIG. 1, a set of magnets 40 is disposed along the length of the delay line wire 12 with their pole pieces in confronting relationship to the circumference of the wire and disposed sufficiently close thereto that an appreciable portion of the magnetic field between the pole pieces passes through the permeable wire 12. Set 40 comprises 512 magnets, corresponding to the number of bits in the code group to be detected, and designed successively in the series 1001, 1002 . . . 1512 in order of their position in a direction *opposite* to the direction of propagation of waves along the delay line. The magnets are so constructed and disposed that the center-to-center distance between the pole pieces of each magnet and the center-to-center distance between pole pieces of adjacent magnets is equal to the distance W between opposite peaks of the torsional deformation wave produced by twist cycle phase control 16 and torquer 18. Each magnet of set 40 is adapted to be preset in either of two orientations of its north (N) and south (S) poles along the delay line wire. The orientation in which the N pole is disposed toward the launch end 19 of the wire is designated to represent a "1" bit and the other orientation to represent "0" bit, and the orientation of the individual magnets in the series 1001, 1002 . . . 1512 are pre-arranged to correspond to the sequential order of the "0" and "1" series of the code group to be detected. This has been shown by the "0" and "1" designations above the magnets in FIG. 1. It is to be noted that if the magnets of set 40 are considered in order of position in the direction of propagation of wave along the wire, they are pre-arranged in a series representing the reverse sequence of the code group. Shown in FIG. 5, is a detail of magnet 1512 representing a "1." The external portion of the flux path of the magnet, illustrated by dotted lines 41 emerges from the N pole and passes across the surface of the delay line wire 12, and thence the flux passes longitudinally through the magnetically permeable delay line wire 12 to a position opposite the S pole and again crosses the surface of wire 12 and returns to the S pole. Associated with magnet 1512 is a pair of transverse reference stations along wire 12, which pair consists of a peak flux crossing station 1512(I) at the position under the pole farthest from launch end 19 where the peaks of the flux intensity occurs, and a similar peak flux crossing station 1512(II) under the other pole. It is to be noted that in designating these stations, the Roman numerals correspond to the order of position of each station of the pair in the direction *opposite* to the direction of propagation along the line. Stations associated with the other magnets of the set are similarly designated. It is to be noted that the U-shaped flux line 41 through wire 12 enters, and emerges from, the circumferential surface of the wire in opposite radial directions. Also flux line 41 crosses the one and the other of the pair of flux crossing stations with opposite directions of flux polarity, the particular polarity at the respective stations depending upon the magnet orientation. The opposite ends of the delay line wire 12 are connected through leads 42*a*, 42*b* to a pair of output terminals

44 and thence to a suitable output amplifier 46 which provides the signal output $S_{out}$ of detector device 10.

The interaction between the wave motion along wire 12 and the magnetic field applied to the wire by magnet set 40 may be best understood by first considering the interaction of the previously described traveling wave cycle 38 in traversing a single magnet 48, FIG. 6A. For this purpose a voltage measuring instrument 50 is assumed to be connected across the region of the wire under the influence of magnet 48 to measure the voltage thereacross, and which measures voltage of the side of magnet 48 adjacent launch 19 end of the wire relative to the other side of the magnet. In accordance with basic principles of wave motion, deformation wave cycle 38, FIG. 6A, is followed by a circumferential velocity wave cycle represented by a semi-sinuous solid line 52 and associated arrows indicating the direction of the magnitude of the circumferential velocity. Circumferential velocity wave 52 lags deformation wave 38 by 90° and has a pair of peaks of opposite circumferential velocity 52(I) and 52(II) corresponding to pair of peaks 38(I), 38(II). As the peak of circumferential velocity 52(I) traverses peak flux station 48(II), FIG. 6A, the clockwise circumferential velocity crossing the surface of the wire interacts with a radially inwardly directed sense of flux polarity, and in accordance with the well known vector product rule for induction by motion of a conductor through a magnetic field, a negative voltage pulse 54 waveform F, FIG. 7, is measured by instrument 50. One-half bit period later as velocity peaks 52(I) and 52(II) simultaneously traverse flux station 48(I) and 48(II), FIG. 6B, a peak positive voltage is induced at both stations 48(I) and 48(II), producing a positive pulse 56 of twice the magnitude of pulse 54. Finally, another half-period later, as velocity peak 52(II) traverses flux station 48(I), FIG. 6C, another negative pulse 58 is produced, providing a composite signal 60 one and one-half bit periods long. Thus the measured output across the region under influence of magnet 48 is a bi-directional signal having a sense of polarity depending upon whether the signal bit that produced the deformation waves matches or mismatches the signal bit represented by the magnet. The above explanation using classic conductor and flux field generator theory somewhat oversimplifies the actual complex basis upon which signal 60 is produced, but is provided in the interests of giving physical insight into the time and space domain interaction between the acoustic wave and the flux stations. The fundamental difference between what occurs in the actual complex basic and the simplified generator theory explanation is that the flux field is *not* equal on diametrically opposite sides of the cylindrical conductor in the former, whereas the latter explanation is in part premised upon equal diametrically opposite flux fields. Experimental verification of production of an induced voltage in the conductor has long existed in classic literature of magneto-acoustic effects, and is sometimes called the "Wertheim effect," after the experimentalist who first verified it. This publication is W. Wertheim: "Note sur des courants d'induction produit par la torsion du fer" ("A note on the Induction Currents Produced on the Twisting of Iron") Comptes rendus (offcial journal of the French Academy of Sciences) 35, 702–704 (1852).

From the previous description of the launching of a single cycle of a deformation wave, and its interaction with the field of a single magnet, the interaction of the continuous wave motion across wire 12 and the total magnetic field produced by the set of magnets 40 will be readily understood. Continuous input signal $S_{in}$ actuates drive and phase control 16 and torquer 18 to launch a train of torsional deformation wave cycles along delay line wire 12, with the phase of each individual cycle of the train of waves corresponding to the signal wave information of the corresponding bit of signal $S_{in}$, so that the train of traveling waves along delay line wire 12 has a total characteristic corresponding to the portion of binary signal $S_{in}$ that produced it. As the train of waves progresses along the delay line wire through the magnetic fields each pair of oppositely directed peaks of circumferential motion will coact with the flux fields of the pair of flux crossing stations through which they are passing, producing an individual voltage along wire 12 of a directional characteristic depending on whether the signal bit which the pair of velocity peaks 52(I), 52(II) represents, is a bit which matches or mismatches the corresponding bit charatcer of the code group for which code detector 10 is preset. The delay line wire 12 acts to sum these individual directional voltages, providing a computation in the nature of the algebraic addition of positive and negative values, represented by the opposite senses of polarity of the individual voltages. This sum is then a measure of degree of match or mismatch between corresponding portions of the 512 bit portion of input $S_{in}$ passing through the portion of the wire under influence of set of magnets 40, and the corresponding portions of code group to be detected.

It is understood that in actual practice the limited dynamic response of wire 12 and torquer 18 will not permit the rapid reversals of cycles as herein discussed, but will produce somewhat different displacement wave forms. However, as is well known in accordance with conventional frequency analysis theory the actual waveforms that would occur in practice will contain a substantial frequency component exhibiting such rapid reversal, and will coact with the magnetic fields in the manner described.

It is assumed that input signal is basically a random signal, except for any sequential portion thereof that contains the code group to be detected. Under these conditions there will be an approximately equal number of matches and mismatches, in all cases except the case where a wave representing the code group itself has filled the region of the wire under influence of the magnets, and the aggregate voltage at terminal 44 will therefore be nearly zero. When the presence of the code group to be detected occurs in signal $S_{in}$, and when the wave motion representing the code group fills the region of the wire under the influence of the magnets, the interaction of the circumferential velocity peaks crossing the flux station the magnets will produce a composite output voltage signal wave 66 at terminals 44, waveform G, FIG. 8, that is the sum of 512 individual induced signals 60*a*, 60*b*, etc., produced by individual interactions between wave cycles and magnets. This has been diagrammatically illustrated in FIG. 9 which represents a condition of the actual (and not idealized) torsional velocity wave represented by line 68 along wire 12 at the instant when the code group fills the region of the wire under influence of the magnets and the peaks of the velocity waves are crossing the magnet pole stations. Curve 70, shown directly below the wire, represents the corresponding idealized waveform. Output signal voltage 66 is therefore of appreciable magnitude and has directional qualities, which serve to indicate the presence of the code group.

Further, since the individual bi-directional signal 62*a*, 62*b*, etc. each vary in accordance with the vector product of quantities representing corresponding compared portions of signal $S_{in}$ and the characters of the code group to be detected, and this is followed by a summation of such products, it can be shown that the output at terminals 44 is a measure of the statistical correlation between the corresponding parts, providing a correlation detection action.

An important feature of the described invention is the ease with which the code to be detected may be changed. Individual characters in the code may be changed by simply reversing the polarity of the individual magnets along the line. Also considerable compactness is possible by helically supporting line 12.

Although the flux generating members of set 40 are described as comprising permanent magnets, it should be appreciated that electromagnetic elements could also be employed, in which case electrical controls could also be used to selectively change the code group to be detected.

It is to be recognized that no specific arrangement of the magnets of set 40 is required. No knowledge of the signal is required other than the requirement that the signal be the impulse response of device 10 backwards in time, i.e. the first portion of the signal should be the last portion of the impulse response of the device. Thus to use the structural arrangement shown in FIG. 1 in an asynchronous mode an impulse is launched through torquer 29 down wire 12 with the magnets 40 placed in any spacing or polarity and with any magnetic strength. Since the impulse was put into the line at its end opposite to end 19, the voltage output at terminals 44 will be the impulse response backward in time. A like structural arrangement can be simply modified to detect this signal by substituting a linear amplifier for twist cycle phase control, and then applying the signal to the input of the linear amplifier. In the case of an echo-ranging system where periods of transmission and reception are separated by a period of time, the same device could be used for generating and detecting the signal.

Obviously many modifications and variations of the present invention are possible in the light of the above teaching. It is therefore to be understood that within the scope of the appended claims the invention may be practiced otherwise than as specifically described.

What is claimed is:

1. A method of detecting the presence of a signal train composed of component parts which may vary between two signal states, and occurring in a predetermined timed relationship and having a total characteristic represented by a predetermined combination of component parts, comprising the steps of:

(a) twisting an elongated conductor, such as a wire, in response to the signal in a twist cycle away from its neutral position in such a manner that each cycle propagates a deformation wave along the wire having spaced portions moving in opposite directions of circumferential movement, (b) selectively varying the twist cycle in response to the signal in a manner providing either of the two orders of sequence of the opposite directions of circumferential movement during a single cycle, the cycles of twist producing a traveling wave along said conductor, the order of sequence and spacing of the oppositely circumferentially moving portions of which correspond to the characteristic of said signal, and (c) applying discrete magnetic flux fields to the wire crossing its circumferential surface at predetermined spaced points along its length and in essentially one radial direction at each point, and at such spacing and with such direction of flux polarity to produce an aggregate voltage in said conductor which is an indication of the presence of said signal.

2. The method in accordance with claim 1, said conductor being made of a permeable and magnetostrictive material which transmits acoustic shear waves.

3. The method in accordance with claim 1 wherein, each twist cycle consists of, or at least contains an appreciable frequency component, tending to produce twist of the conductor away from its neutral position to one position of opposite angular positions, and thence in the reverse direction to the other position, and thence back to the neutral position, an each twist cycle is initiated in either of opposite angular directions depending upon the signal characteristic.

4. A method for simultaneously comparing various sequentially timed portions of an input signal train of variable magnitude and signal direction with the corresponding timed portions of a reference signal train, said reference signal train having a total characteristic represented by signal magnitude and direction that varies in a predetermined timed relationship, comprising the steps of:

(a) deforming an elongated conductor in response to the input signal train in a deformation cycle away from its undeformed position in such a manner that each cycle propagates a wave along the conductor having spaced portions moving in opposite senses of movement, (b) selectively varying the deformation cycle in response to the input signal train in a manner to produce a traveling wave along the conductor, the order of sequence of the opposite senses of movement during a cycle and their spacing corresponding to the characteristic of the input signal train, (c) applying a magnetic flux field to said conductor to cross the surface thereof along its length, said flux field crossing through the surface of the conductor at each point therealong in such direction to be co-active with the traveling wave to induce a voltage along the conductor, said flux field having predetermined varying characteristics along the length of the conductor away from the point at which the deformation cycle is applied thereto in accordance with a desired function of the variation with time of said reference signal train, and selected to match the characteristics of the traveling wave, whereby the passing of the wave train through the magnetic field produces voltages in various portions of the length of the line of opposite polarities in accordance with the vector product of the corresponding portions of the input signal and the matched flux field, and (d) measuring the voltage across the ends of the portion of the conductor to which the magnetic field is applied.

5. A method in accordance with claim 4, said conductor being made of a permeable and magnetostrictive material which transmits acoustic shear waves.

6. The method in accordance with claim 4, wherein said function is a reversed replica of the reference signal train, whereby the measured voltage is an approximate indicia of correlation.

7. The method in accordance with claim 4 wherein said total characteristic of the reference signal train is a predetermined combination of component parts of predetermined intervals of time and having discrete signal states, said reference flux field comprising a predetermined set of discrete magnetic flux circuits, said flux circuits of the set forming a flux path which at least in part passes through the conductor and defining a pair of longitudinally spaced peak opposite polarity flux stations along the conductor through which the flux path crosses a portion of the surface of the conductor moved by each deformation cycle, said flux circuits of the set being adapted to be preset to provide either of opposite orientation of the flux polarities at the flux stations, said flux circuits being arranged in a predetermined order and sequence of orientaions along the conductor.

8. The method in accordance with claim 4 wherein each deformation cycle consists of, or at least contains an appreciable frequency component, tending to twist the conductor in one and the other of reverse angular directions away from its undeformed position, and selectively in either of opposite sequences.

References Cited by the Examiner

UNITED STATES PATENTS

| | | | |
|---|---|---|---|
| 3,020,416 | 2/1962 | Van Vechten et al. | 333—30 |
| 3,127,578 | 3/1964 | Long | 333—30 |

FOREIGN PATENTS

| | | |
|---|---|---|
| 827,258 | 2/1960 | Great Britain. |

OTHER REFERENCES

"Wire-Type Acoustic Delay Lines for Digital Storage," by Scarrott and Naylor, in the Institution of Elec. Engineers, London, Proceedings, vol. 103, Supp. 3, 1956, p. 497. P. 501 relied on.

"Digital Function Generation With Torsional Delay Lines," by Parzley and Fishbein, in Electronics, January 12, 1962, p. 62.

MALCOLM A. MORRISON, *Primary Examiner.*

I. FAIBISCH, *Assistant Examiner.*